W. WITHINGTON.
METHOD OF MAKING RAKES.
APPLICATION FILED AUG. 15, 1917.
1,304,436.
Patented May 20, 1919.
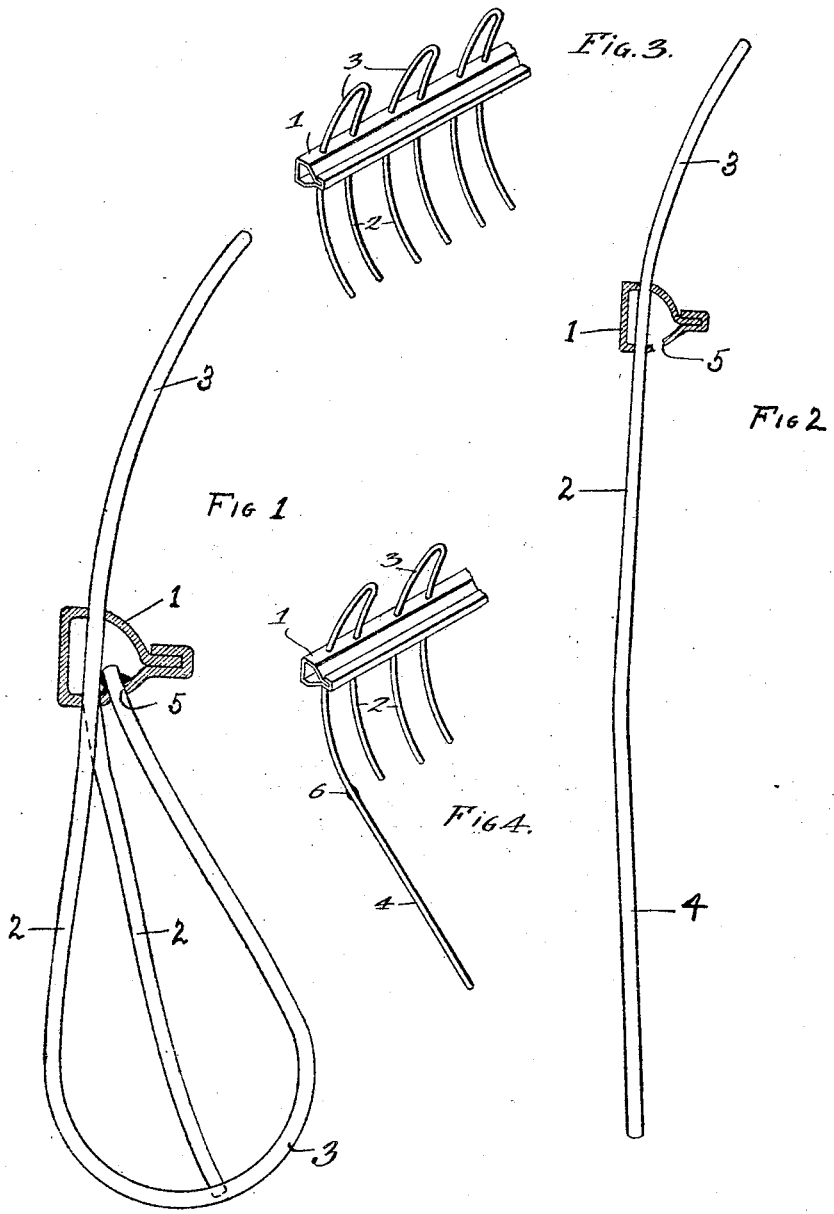
INVENTOR
Winthrop Withington
BY Fay, Oberlin & Fay
ATTORNEYS

UNITED STATES PATENT OFFICE.

WINTHROP WITHINGTON, OF JACKSON, MICHIGAN, ASSIGNOR TO THE AMERICAN FORK & HOE COMPANY, OF CLEVELAND, OHIO, A CORPORATION OF OHIO.

METHOD OF MAKING RAKES.

1,304,436.  Specification of Letters Patent.  Patented May 20, 1919.

Application filed August 15, 1917. Serial No. 186,404.

*To all whom it may concern:*

Be it known that I, WINTHROP WITHINGTON, a citizen of the United States, and a resident of Jackson, county of Jackson, and State of Michigan, have invented a new and useful Improvement in Methods of Making Rakes, of which the following is a specification, the principle of the invention being herein explained and the best mode in which I have contemplated applying that principle, so as to distinguish it from other inventions.

The present invention relates, as indicated, to a method of making wire rakes with particular regard to an improved process of forming the end teeth of such rakes in such a manner that they will act as guides or runners upon which the rake will be supported in use. To the accomplishment of the foregoing and related ends, said invention, then, consists of the means hereinafter fully described and particularly pointed out in the claims.

The annexed drawing and the following description set forth in detail one approved method of carrying out the invention, such disclosed mode, however, constituting but one of the various ways in which the principle of the invention may be used.

In said annexed drawing:—

Figure 1 is a transverse section of the head of the wire rake, to one tine of which has been added a strip of metal; Fig. 2 is a similar view showing the rake during manufacture; Fig. 3 is a partial perspective view of the rake as it is assembled; and Fig. 4 is a similar view showing the additional strip welded to one of the end tines.

In wire rakes it is usual to provide a head 1, which is preferably hollow and is provided with a plurality of parallel substantially vertical openings through which are passed the tines 2 of each wire loop 3. These tines are then soldered into place in the head, the tinning on the tines acting under heat as solder to firmly attach the wire loops in the head.

In wire rakes which are commonly known as lawn rakes and are used for collecting leaves, grass and other similar material from lawns, considerable difficulty has been met with caused by the bending of the end tines out of the line of the tines of the rake. These end tines when so bent often cause the rake to stick in the grass, and they are very subject to such bending and even breakage, as the rake is usually dropped on the ground and lands on one of the two end tines. I have devised a guard or protecting guide to be disposed at the ends of such a rake, the construction of which forms the subject matter of a co-pending application filed by me June 14, 1917, Serial No. 174,656, and the present invention relates to a method of forming or attaching said guides to the ends of a wire rake.

The present invention consists in a method of forming the end tines and involves the welding of a strip of metal 4 to the end of the outer one of the tines 2. The strip 4 is of the same size and cross section as the tine 2 and is buttwelded thereto, the joint then being ground or otherwise smoothed off to remove the bur. The joint is indicated at 6.

This long tooth or tine is then bent into the shape of a loop 3, either by hand or in a machine as may be desired, and the free end is inserted in an aperture 5 formed in the head 1 adjacent to the aperture through which the tine proper is passed. The extra strip of metal 4 is also tinned and this tinning acts as a solder under heat to fasten the free end of the long tine into the aperture 5 in the head 1.

In the manufacture of my improved rake a series of standard loop tines 3 are first threaded into a rake head 1 in the manner shown in Fig. 3. I then attach the extending strips 4 to the ends of two of the tines of the rake of Fig. 3, and it is desirable to attach these additional strips 4 to the end tines. The attachment can best be secured by butt-welding the strips to the ends of the tines, which will produce an enlargement or bur 6 at the joint. This bur is then removed by grinding or other suitable methods, giving the end tines the form shown in Fig. 2, after which they may be formed into the loops which are shown in Fig. 1 and which extend equidistantly on either side of the plane of the ordinary tine 2.

By using my improved method of forming the end tooth of such a rake it is made possible to construct the rake in the usual manner, in which all the U-shaped loops which form the tines are threaded into the head, and to then attach an extra piece of metal to the two end tines and produce therefrom the curved guides or loops which serve as runners to support the two ends of the rake.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. In a method of making rakes, the steps which consist in mounting a series of U-loops in a rake head with the spaced ends parallel to each other and in the same plane, and constituting tines, integrally joining strips of metal to one end of each of two of such tines, and then bending such joined strips into loops projecting forwardly and rearwardly from the plane of such tines.

2. In a method of making rakes, the steps which consist in mounting a series of U-loops in a rake head with the spaced ends parallel to each other and in the same plane, and constituting tines, integrally joining strips of metal to one end of each of two of such tines, and then bending such joined strips into loops projecting forwardly and rearwardly from the plane of such tines, and then fastening the free ends of such joined metal strips in said head.

Signed by me, this 7 day of August, 1917.

WINTHROP WITHINGTON.

Copies of this patent may be obtained for five cents each, by addressing the "Commissioner of Patents, Washington, D. C."